UNITED STATES PATENT OFFICE.

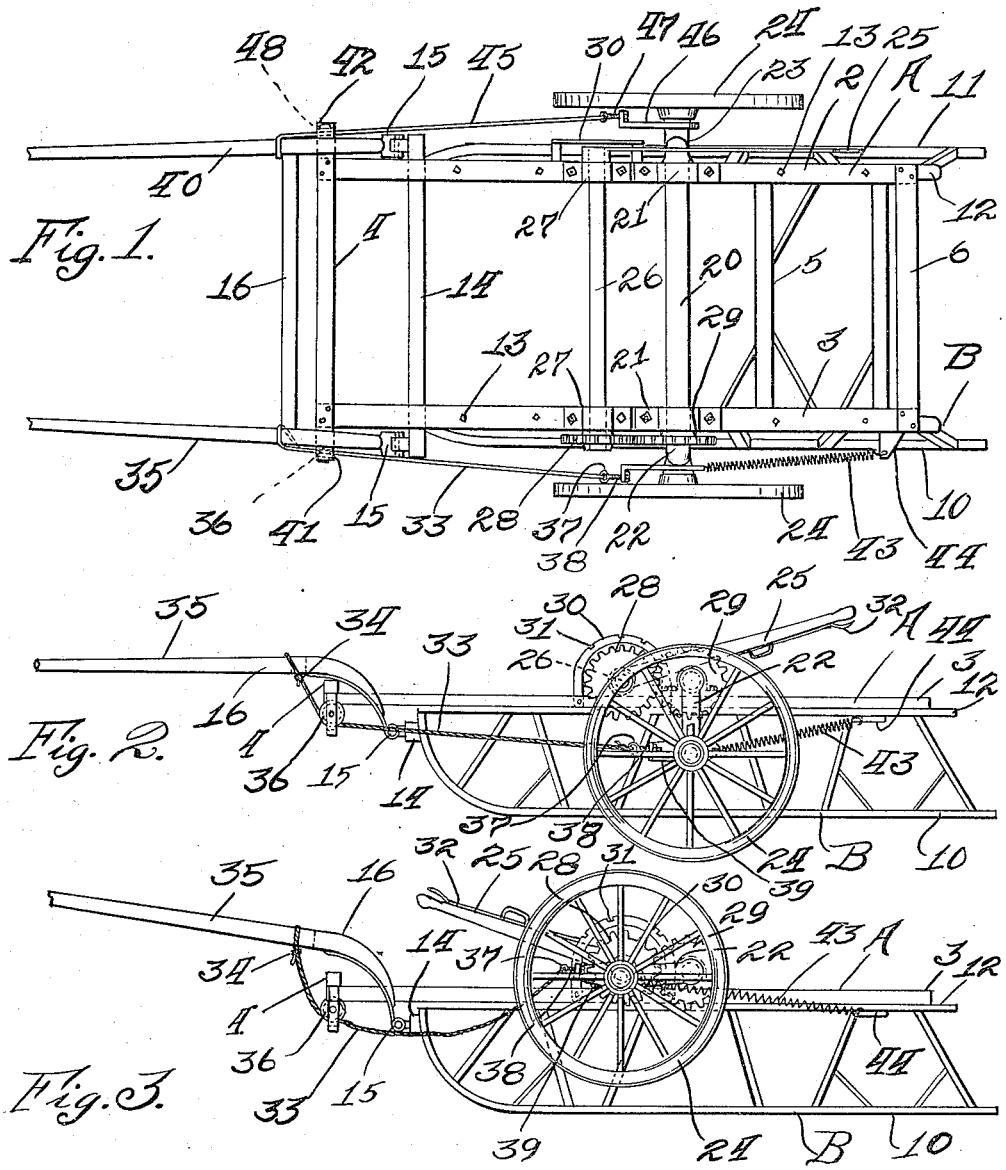

OLE T. AASEN, OF STARBUCK, MINNESOTA.

CHANGEABLE VEHICLE.

1,164,051.      Specification of Letters Patent.      Patented Dec. 14, 1915.

Application filed March 15, 1915. Serial No. 14,338.

*To all whom it may concern:*

Be it known that I, OLE T. AASEN, a citizen of the United States, residing at Starbuck, in the county of Pope and State of Minnesota, have invented a new and useful Improvement in Changeable Vehicles, of which the following is a specification.

The object of this invention is to provide a changeable vehicle of improved construction, which will enable the vehicle being easily and quickly changed, so that it can be used either as a sleigh or wheeled carrier.

A further object is to provide means whereby the vehicle can be changed more easily than heretofore either to a wheel carrier or sleigh, while the vehicle is in motion, thus enabling the operator at will to easily change the vehicle into such form as will best suit the conditions of a road.

In the accompanying drawing forming part of this specification, Figure 1 is a plan of my invention; Fig. 2 is a side elevation, showing the parts positioned when the vehicle is operated as a wheeled carrier, and Fig. 3 is another side elevation showing the parts positioned when the vehicle is operated as a sleigh.

The invention is particularly adapted for use as a two wheeled vehicle or sleigh, and the parts are constructed to coöperate accordingly.

In the drawing A indicates a suitable body frame, which as illustrated is of rectangular shape, consisting of a pair of side bars 2 and 3 and cross bars 4, 5 and 6. To the lower side of this frame is secured a sleigh B having side runners 10 and 11 suitably mounted upon the runner frame work 12, the latter being fastened such as by bolts 13 to the body frame A. To the forward end of the sleigh is secured a cross bar 14, to which is attached by hinge couplings 15 thills 16. Across the top of the frame A is an arched axle, its horizontal body portion 20 being journaled by the bearings 21 on the frame substantially midway between its ends and formed with crank arms 22 and 23 on its ends radiating in the same direction. Upon the outer ends of these crank arms are journaled a pair of carrier wheels 24, the peripheries of which rest upon the ground when the crank arms radiate downwardly, thus holding the sleigh in superior position off of the ground. When the crank arms are swung by the body portion 20 of the shaft into horizontal or upward position, the peripheries of the wheels 24 are held above the ground by the sleigh runners, which are then made to carry the vehicle. The means for making this change, consists of an operating lever 25 secured to the end of a counter shaft 26, which is journaled in bearings 27 across the frame A. This shaft carries on its end opposite that from the operating lever a gear wheel 28, the teeth of which mesh with another gear wheel 29, said gear wheel 29 being mounted upon the horizontal portion 20 of the axle. Thus by swinging the lever 25, the gear wheels cause the axle to turn and swing the crank arms either into downwardly extending or horizontal position. A segment 30 having notches 31 and mounted on the frame A coöperates with the lever and forms a locking engagement by means of lock arm mechanism 32 to hold the axle in selected position with the wheels bearing upon or carried above the ground by the sleigh runners.

The hinge couplings 15 permit the thill 16 swinging freely in the usual manner upon the sleigh when the vehicle is operating as a sleigh and the wheels are raised above the plane of the runners, but owing to the vehicle being mounted upon two wheels when traveling as a wheel carrier, it becomes necessary that the body frame be rigidly locked to the thill, so that the load is balanced by the horse and the frame and runners prevented from tilting up and down at random. To accomplish this result of locking the thill to the vehicle body the following mechanism is provided.

A cable 33 is secured by a clip 34 around one shaft 35 of the thill at a point distanced forwardly from the hinge connections produced by the couplings 15. This cable travels over a guide sheave 36 mounted upon the forward end of the body frame A and depending from one end of the cross bar 4. The opposite end of the cable 33 from that which is attached to the thill is secured through the eye 39 of an adjusting bolt 38, which is fastened to an anchor plate 39. This anchor plate is journaled freely on the outer end of the crank arm 22.

The thill shafts 35 and 40 swing downwardly upon the couplings 15 until striking against the outwardly projecting ends of the cross bar 4, forming stops 41 and 42, and the length of the cable 33 is proportioned so that when the crank arms 22 are swung downwardly into vertical position, they tighten the cable and hold the thill shafts locked against said stops 41 and 42. In this manner a rigid connection is made between the thill and the body of the vehicle when the wheels are lowered with their peripheries in a plane below that of the runners. To assist in locking the thill and also hold the anchor plate with its end extending in a forward direction, a draw spring 43 is fastened to a portion of the anchor plate 39 and to a clip 44, which is fastened to the frame work 12 of the sleigh.

In operation when it is desired to convert the vehicle into a wheeled carrier, the operating lever 25 is thrown from the position illustrated in Fig. 3 into the position illustrated in Fig. 2, the crank arms being thereby thrown from forwardly extending substantially horizontal position into downwardly extending vertical position, whereupon the cable 33 is tightened, drawing the thill shafts tightly compressed against said stops. In this manner the body of the vehicle is supported on the axle 20 and the thill, which is attached to the horse. The movement from the position illustrated in Fig. 3 is augmented by the spring 43, said spring being attached to the anchor plate and the body of the vehicle at an angle which causes it to exert a pulling force upon the crank arm on which the anchor plate 39 is journaled. When the vehicle is changed from the position illustrated in Fig. 2 to the position illustrated in Fig. 3, the operating lever 25 is swung forwardly against the tension of the spring 43 and the cable 33 slackens, thus permitting the thill to swing freely upon the forward ends of the runners, allowing the runners to travel freely on the ground with the wheels in raised position. In order to evenly distribute the locking effect of the thill shafts against the stops 41 and 42, another cable 45 can be attached to the thill shaft 40 and connected by an anchor plate 46 journaled on the crank arm 23 and by an adjusting bolt 47, said cable passing around another guide sheave 48 on the stop portion 42 of the cross bar 4, whereby the cable tightens and loosens simultaneously with the companion cable 33.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claim.

Having described my invention, what I claim as new and desire to protect by Letters Patent is:—

A changeable sleigh and wheeled vehicle, comprising, in combination, a carrier body having sleigh runners depending therefrom, an axle journaled on said body and having crank arms extending laterally from its ends, carrier wheels journaled on the ends of said crank arms, a thill hinged upon said body, said body having a stop interposed in the path of downward travel of said thill upon its hinged connection, a guide arranged below the point of said hinge connection, a flexible connection attached to said thill, traveling over said guide and connected to one of said crank arms, whereby the swinging movement of said crank arms in converting said vehicle from a sleigh into a wheeled carrier tightens said cable and locks said thill against said stop, and a draw spring connected to one of said crank arms and said body and serving to assist in swinging said wheels in a downward direction.

In testimony whereof, I have signed my name to this specification in the presence of two subscribing witnesses.

OLE T. AASEN.

Witnesses:
C. W. HALBERT,
STELLA L. WASCHENBERGER.

Copies of this patent may be obtained for five cents each, by addressing the "Commissioner of Patents, Washington, D. C."